United States Patent [19]

Wei

[11] Patent Number: 4,840,212

[45] Date of Patent: Jun. 20, 1989

[54] AUTOMATIC AIR PUMP FOR WHEEL TIRES

[76] Inventor: Yung-Kuan Wei, No. 1, Lane 970, Sec 2, Pen Tien St., Tainan, Taiwan

[21] Appl. No.: 2,919

[22] Filed: Jan. 13, 1987

[51] Int. Cl.$^4$ .................. B60C 23/10; B60C 23/12
[52] U.S. Cl. .................. 152/419; 152/425; 137/224; 116/34 R; 141/38
[58] Field of Search ............... 152/415–419, 152/424–426; 141/38, 95; 137/223, 224, 227; 73/146.2, 146.3, 146.5; 116/34 R, 34 A, 34 B

[56] References Cited

U.S. PATENT DOCUMENTS

| | | | |
|---|---|---|---|
| 677,710 | 7/1901 | Stacy | 152/425 |
| 1,132,167 | 3/1915 | Craw | 152/425 |
| 1,373,068 | 3/1921 | Harper | 152/419 |
| 2,119,735 | 6/1938 | Campbell | 152/425 |
| 4,067,376 | 1/1978 | Barabino | 152/418 |
| 4,582,108 | 4/1986 | Markow et al. | 152/418 |

FOREIGN PATENT DOCUMENTS

800211  9/1950  Fed. Rep. of Germany ...... 152/424

Primary Examiner—Benoit Castel
Attorney, Agent, or Firm—Morton J. Rosenberg

[57] ABSTRACT

A automatic air pump for car wheel tires, especially those without tubes, utilizes an air piston with a cylinder fixed on a rim which enables its piston plate to contact and be pushed by the interior tire surface successively by the wheel rotation compressing air into the tire chamber until the pressure grows sufficient and the piston rod no longer touches the interior tire surface. If a static wheel is also desired to be pumped full of air automatically, a compressor and a pressure-gauge piston can be added. When the tire pressure grows insufficient, the compressor can be started by detaching a metallic plate from two metallic projections caused by the interaction of the piston rod and the interior tire and air is sucked into the cylinder and flows into the tire chamber sufficiently. Then a piston plate of a pressure-gauge piston is lifted up making an electric connection to cut the electricity from the compressor and the piston rod recovers its original position.

5 Claims, 8 Drawing Sheets

AUTOMATIC AIR PUMP FOR WHEEL TIRES

BACKGROUND OF THE INVENTION

It is quite bothersome for drivers that they have to pay attention to the pressure all the time and drive the car to a garage or a gas station to pump a tire when necessary. In order to solve such concerns, the inventor has conceived and developed the below disclosed automatic air pump for wheel tires.

SUMMARY OF THE INVENTION

The present invention, an automatic air pump for wheel mounted tires, makes use of an air piston which is to be fixed on the wheel rim and can automatically pump air into the tire by the contact between a piston rod and the interior tire surface. The above-mentioned air pumping action can only take place when the wheel is turning. Another facet of the present invention is the provision of with a compressor and a pressure-gauge piston, which can carry out pumping, regardless if the wheel is turning or not.

In addition, the present invention provides a pressure switch which is set to control the pressure desired and a water sensor which is provided to stop the piston when the wheel is immersed in water.

DETAILED DESCRIPTION OF THE INVENTION

This invention includes, singularly and in combination, two different structures, one of which, A, is suitable for inflating wheel tires that must be running and the other, B, suitable for inflating wheel tires that are short of air pressure in spite of whether they are running or not.

Air pump A, as shown in FIGS. 1 to 6, comprises air piston A1, inhaling valve A2, exhaling valve A3 and light indicating system A4.

Air piston A1 contains spring A12 in a cylinder A11 and a piston plate A13 that is positioned to contact with spring A12 and connect with piston rod A14 extending outward. When the pressure in the tire is insufficient, piston rod A14 will be pressed by interior tire surface T1 so that piston plate A13 is to be pushed up to press spring A12, enabling the air in the cylinder to flow through exhaling valve A3 into its chamber T2. Since the wheel tire keeps running, piston rod A14 is successively pressed by interior tire surface T1 to move reciprocatingly, so that air is successively sucked into cylinder A11 via inhaling valve A2 while piston plate A13 moves downward to the bottom of cylinder A11 and transfered into the tire chamber via exhaling valve A3 while piston plate A13 is pushed up, forming a continuous air pumping.

Figure 1:
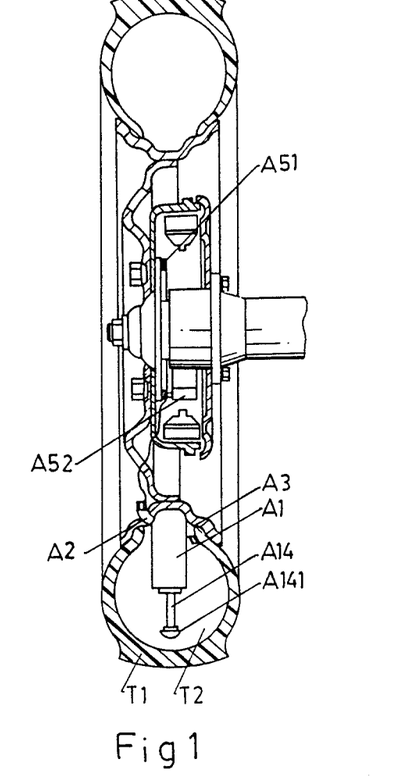
FIG. 1 is a view of an air pump according to the preferred embodiment of the present invention fixed on a wheel of a drum brake; in this invention.
Figure 2:
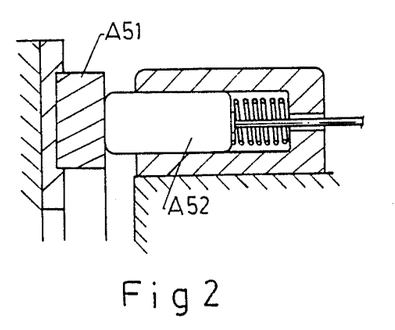
FIG. 2 is a magnified view of the mutual touching of a copper plate and a carbon brush in the present invention.
Figure 3:
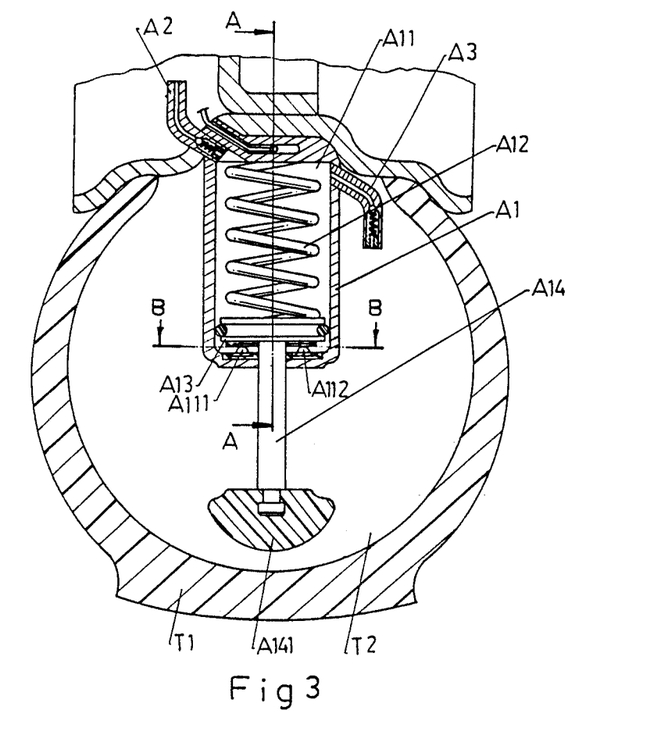
FIG. 3 is a cross-sectional view of air pump A in this invention.
Figure 4:
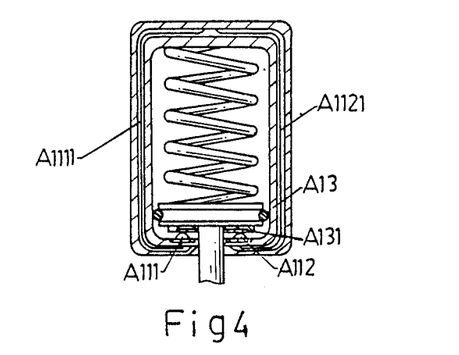
FIG. 4 is a cross-sectional view taken along line A—A on FIG. 3.
Figure 5:
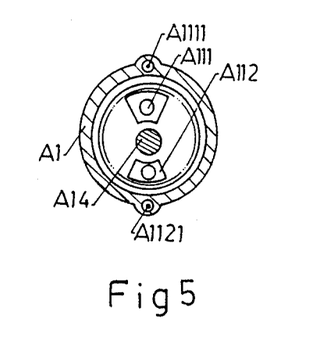
FIG. 5 is a cross-sectional view taken along line B—B on FIG. 3.
Figure 6:
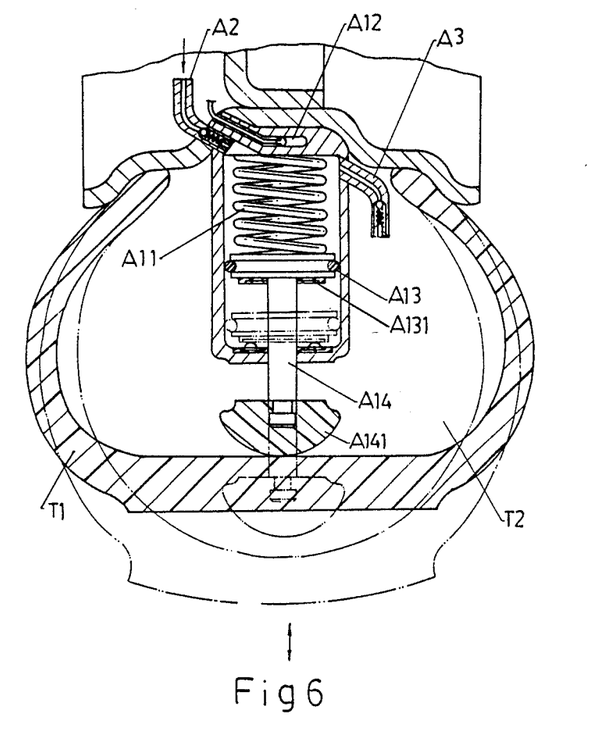
FIG. 6 is a view of a piston rod pressed by the interior tire surface and a piston plate pressed as a result of insufficient air pressure.
Figure 7:
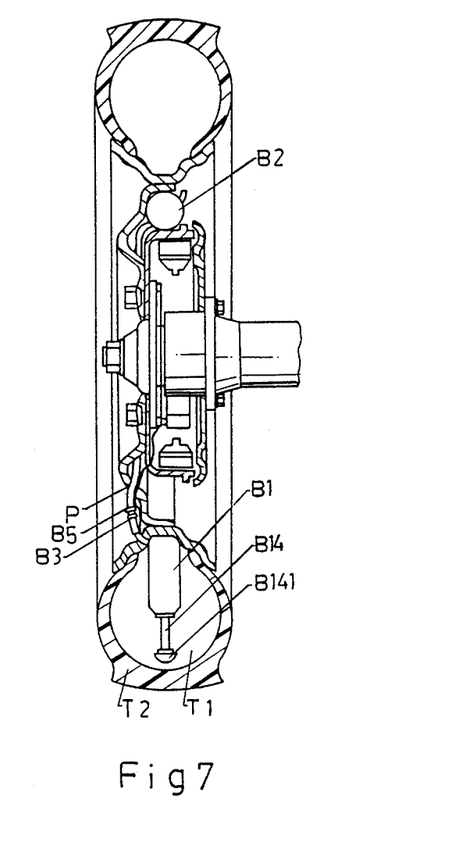
FIG. 7 is a view of air pump B fixed on a wheel.
Figure 12:
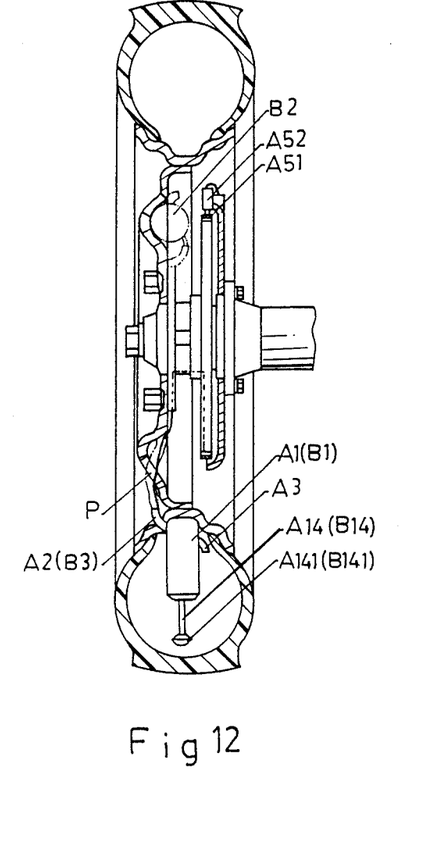
FIG. 12 is a cross-sectioned view of the metnod of transmitting electricity of the present invention when the air pump A is installed on a wheel with a disc brake.
Figure 13:
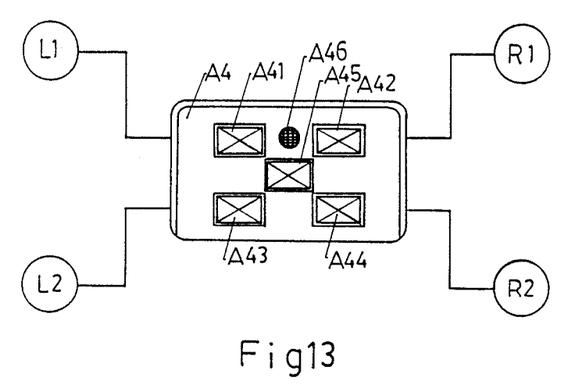
FIG. 13 is a diagram of the signal lights of pumping air in the tire in this invention.
Figure 14:
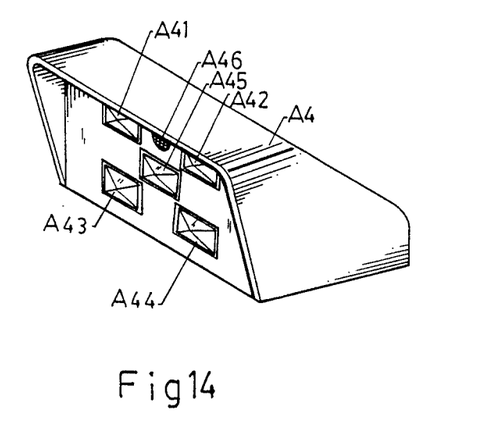
FIG. 14 is a view of the signal lights which indicate the pumping of air in the present invention.

Furthermore, as shown in FIG. 4, a metallic plate A131 set below piston plate A13 is to contact with two metallic projections A111,A112 set under piston rod A13 while the tire pressure is sufficient and air indicating light A41 or A42,A44 will not be lighted. But, when the tire pressure is insufficient, interior tire surface T1 is to press piston rod A14, as shown in FIG. 6, and metallic plate A131 will separate from metallic projections A111,A112, so the air indicating light A41 or A42,A43,A44 as shown in FIGS. 13, 14, controlled by metallic projections A111, A112 will be lighted and tell the driver which wheel tire is now short of pressure and being pumped. Conductive lines A1111, A1121 extend respectively from the metallic projections A111, A112 and are buried in the wall of the cylinder and connected to copper plate A51 which is linked to the power source and indicating lights via magnetic brush A52, as shown in FIGS. 2, 12.

Figure 8:
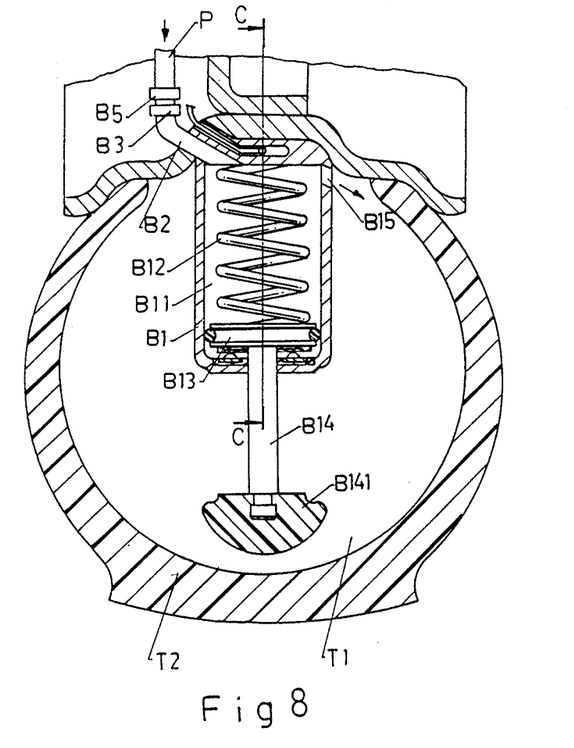
FIG. 8 is a cross-sectional view of air pump A.
Figure 9:
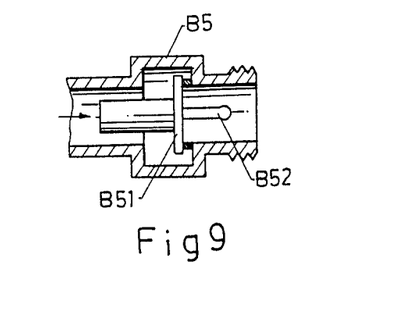
FIG. 9 is a cross-sectional view of the valve tube of air pump B.
Figure 10:
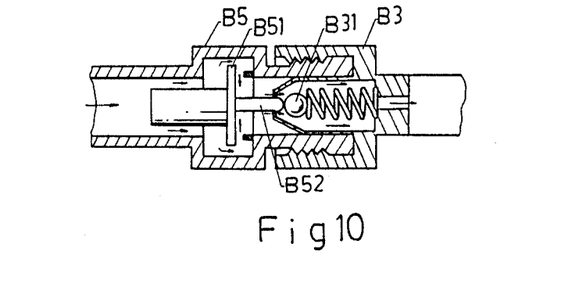
FIG. 10 is a view depicting pumped air when the valve tube of air pump B causes the inhaling valve to open.
Figure 11:
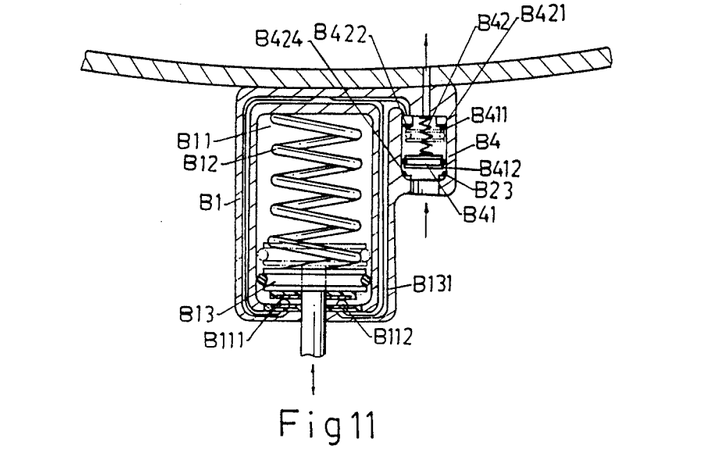
FIG. 11 is a cross-sectional view taken along line C—C in FIG. 8.

FIGS. 7 to 12 show the B structure of this air pump which consists of air piston B1, compressor B2, inhaling valve B3 and pressure-gauge piston B4. Air piston B1, as shown in FIG. 8, has spring B12 in its cylinder B11 and piston plate B13 which is set below spring A12 and to be moved by piston rod B14 connected with semi-spherical head B141 at its bottom for interior tire surface T2 to press easily and smoothly while the tire pressure is lower than the normal. Also, a metallic plate B131 set under piston plate B13 is to contact with two metallic projections B111, B112 set at the bottom of the cylinder when the pressure is sufficient, keeping the compressor in an operating condition; when the tire pressure is reduced to enable interior tire surface T2 to press semi-spherical head B141 of piston rod B14, dotted line as shown in FIG. 11, metallic plate B131 is moved off the metallic projections B111, B112 signalling compressor B2 to opeate, pumping up the air into the cylinder of air piston B1 via inhaling valve B3 and then into tire chamber T1 automatically via an exhaling valve.

When the tire pressure has been pumped sufficiently, piston plate B41 of pressure gauge piston B4 is pushed by the pressure in the tire and caused to rise up. The metallic plate B411 set above piston plate B41 functions to light a status indicator A4 as well as signalled compressor B2 to stop operating at once when plate B411 contacts with two metallic projections B421, 422 set above cylinder B42, and piston rod B14 of air piston B1 recovery to its original state. If the tire pressure is not low enough to cause the interior tire surface to touch piston rod B14, piston plate B41 of pressure gauge piston B4, being biased by insufficient pressure, is to gradually drop down to the bottom of cylinder B42, enabling the metallic plate B412 connected under piston plate B41 to finally contact metallic projections B423,424 so that compressor B2 gets started and keeps operation until the tire pressure becomes sufficient. When the pressure reaches the proper level, piston plate B41 rises up making metallic plate B411 contact metallic projections B421,422 thus stopping the operation of the compressor.

In addition, in order to allow the air to be easily pumped into the tire chamber via inhaling valve B3 while compressor B2 is operating, valve tube B5 is set between tube P and inhaling valve B3, as shown in FIGS. 7, 8, 9, 10. Valve tube B5 has inside valve plate B51 connected at its inner surface with pushing rod B52 which is to push away ball B31 (or a plate, etc.) of inhaling valve B3 during the operation of the compressor, allowing the compressor to compress more easily because it doesn't have to push away ball B31.

For the sake of safety, wheels equipped with this invention are preferably provided with a pressure switch and a water sensor. The pressure switch is arranged to be actuated by a certain maximum amount of pressure which varies according to the kind of car and can automatically turn off the compressor as soon as the tire pressure has reached the maximum allowed by the switch. The water sensor causes the compressor to be incooperative when the wheel is running in water, preventing it from sucking water into the tire chamber.

Moreover, besides the air indicating lights A4 which can tell the driver the air pressure condition of the four wheels, another supervisory lamp A45 and buzzer 46 are additionally provided. When any of the wheels is being pumped, its indicating light and supervisory lamp will be lighted together and buzzer 46 will give a sound until the pumping action has been finished, so that the driver can be unerringly warned by the light and the sound to pay attention to the air pressure situation.

Conclusively, this invention is really a very practical, safe and novel invention.

What is claimed is:

1. Apparatus for automatically maintaining and indicating a desired pressure in a pneumatic tire which is mounted on a wheel of a vehicle, comprising:
    a piston;
    cylinder means adpated to be fixed to the wheel and defining a space in which said piston is mounted to reciprocate;
    contact means attached to said piston and adapted to engage an interior portion of the pneumatic tire when the tire is inflated beneath the desired pressure and thereby displace said piston to compress air within said space;
    means for biasing said piston relative to said cylinder means so that said contact means is urged toward the interior portion of the tire and said piston is urged toward an end wall of said cylinder;
    exhaling valve means for allowing air to pass from said space to the area bounded by the interior of the tire when said piston compresses the air within said space;
    inhaling valve means for allowing air to enter from an external atmosphere to said space when said piston depressurizes said space by displacement toward said end wall, whereby an alternate pressurization and depressurization of the space by the piston as the wheel rotates causes air to be supplied to the are bounded by the interior of the tire;
    switching means positionally located within said space defined by said cylinder means for opening an electrical path responsive to displacement of said piston from said end wall of said cylinder means; and
    means responsive to said switching means for indicating the displacement of said piston from said end wall and thereby indicate to an operator of said vehicle a tire inflation beneath said desired pressure.

2. Apparatus according to claim 1, wherein said switching means comprises a first electrical contact on said piston and a second electrical contact on said cylinder.

3. Apparatus for automatically maintaining a desired pressure in a pneumatic tire which is mounted on a wheel, comprising:
    a piston;
    cylinder means fixed to the wheel and defining a cylinder space therein in which said piston is mounted to reciprocate;
    contact means attached to said piston and adapted to engage an interior portion of the pneumatic tire when the tire is inflated beneath the desired pressure and thereby displace said piston relative to said cylinder;
    means for biasing said piston relative to said cylinder means so that said contact means is urged toward the interior portion of the tire and said piston is urged toward an end wall of said cylinder;
    compressor means for providing a supply of compressed air to the area defined by the interior surface of the pneumatic tire responsive to displacement of said piston from said end wall; and
    switching means positionally located within said cylinder space for opening an electrical path responsive to displacement of said piston from said end wall of said cylinder means and controlling said compressor means in response thereto, whereby compressed air will be supplied to the tire as needed.

4. Apparatus according to claim 3, wherein additional means are provided for controlling said compressor means when pressure in the area defined by the interior of the tire exceeds or falls beneath predetermined minimum and maximum amounts.

5. Apparatus according to claim 4, wherein said additional means comprises a pressure gauge cylinder defining a space which is vented to atmosphere at a first end and is vented to the space defined by the interior of the tire at a second end; a pressure gauge piston mounted for movement in said pressure gauge cylinder between said two ends, means for biasing said presure gauge piston relative to said pressure gauge cylinder toward one of said ends, and electric contact means for controlling operation of said compressor means in response to displacement of said pressure gauge piston.

* * * * *